Sept. 7, 1948.  W. COULSON  2,448,579
CHUCK
Filed June 7, 1947  3 Sheets-Sheet 1

INVENTOR.
WALTER COULSON
BY
ATTORNEY

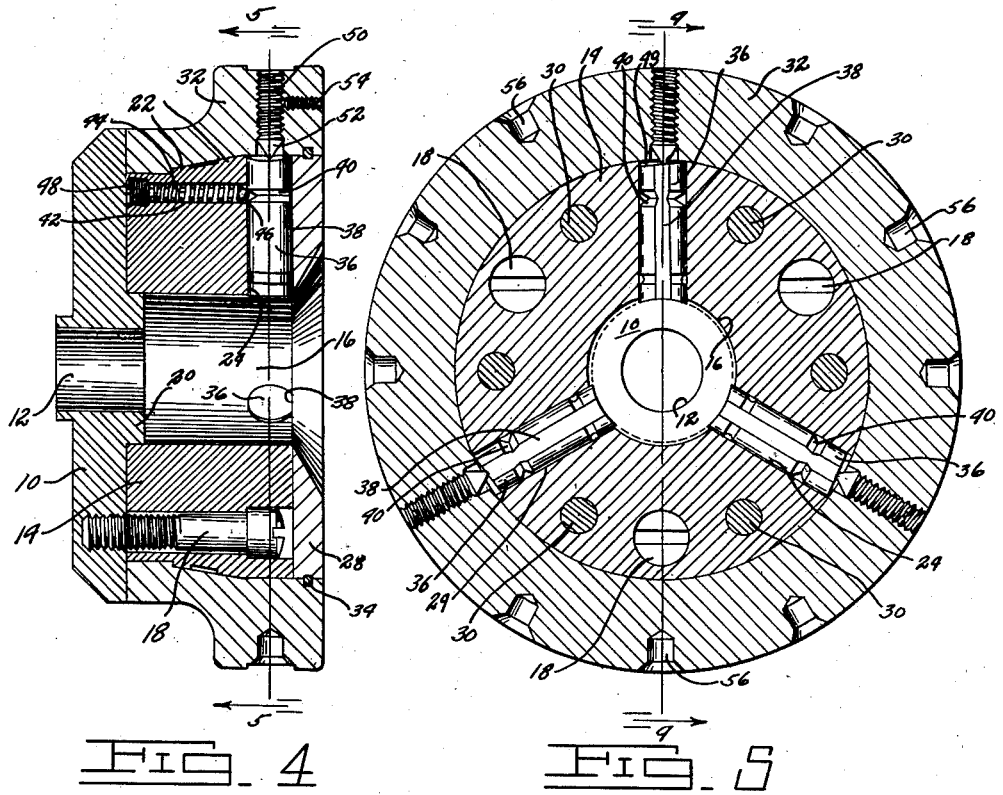
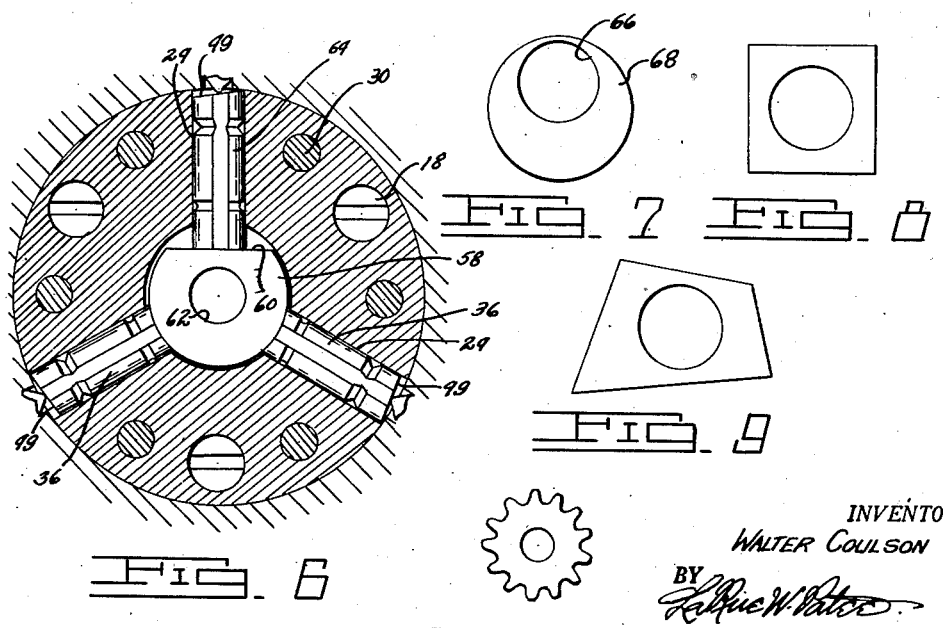

Sept. 7, 1948.　　　　　W. COULSON　　　　　2,448,579
CHUCK
Filed June 7, 1947　　　　　　　　　　　　3 Sheets-Sheet 3
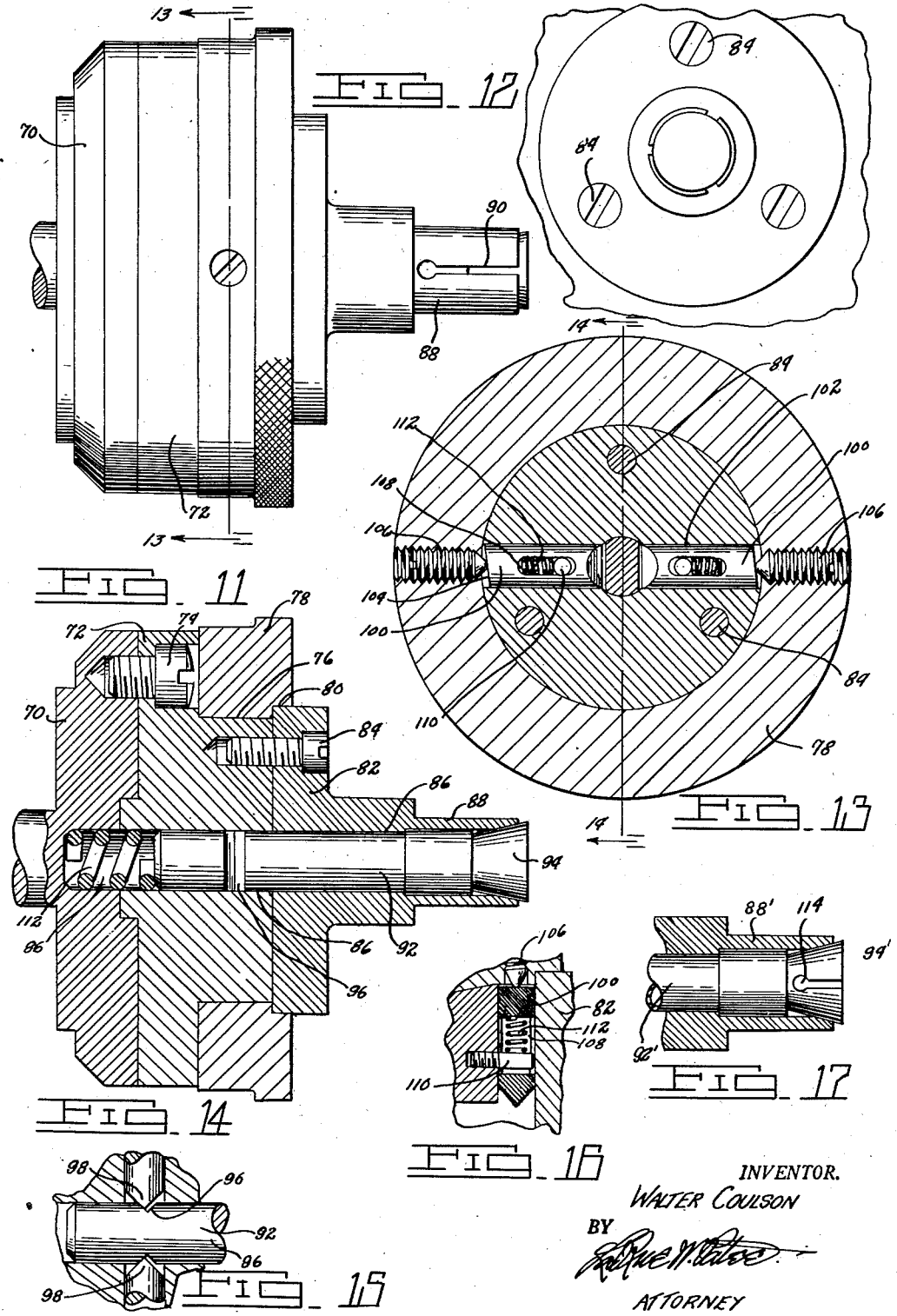
INVENTOR.
WALTER COULSON
BY
ATTORNEY Patented Sept. 7, 1948

2,448,579

UNITED STATES PATENT OFFICE 2,448,579

CHUCK

Walter Coulson, Detroit, Mich.

Application June 7, 1947, Serial No. 753,320

8 Claims. (Cl. 279—66)

This invention relates to a chuck, and more particularly to a precision chuck for holding parts of irregular contour in a predetermined location.

The chuck is designed to accurately grip irregular shaped objects which are to be rotated by a driving member for performing machining operations on the object or to hold the object stationary while a machine tool is rotated during the machining operation.

An important object of the invention is to provide a retainer having a central bore therein with radially movable jaws operable by a circumferentially movable sleeve on the retainer.

Another object of the invention is to provide a retainer having a central bore therein for receiving a work piece and circumferentially spaced, radially extending openings through the retainer from the outer periphery thereof to the central bore for receiving replaceable jaws, together with resilient means for urging the jaws outwardly of the central bore and means for advancing the jaws inwardly by the movement of a circumferentially movable sleeve surrounding the retainer and the jaws.

A further object of the invention is to provide radially movable jaws having outer end faces for engagement with radially adjustable and circumferentially spaced projections on a peripheral surface, the end faces of the jaws being in a plane at an angle to a plane which is tangent to the peripheral surface carrying the spaced projections, whereby rotation of the projections, relative to the jaws, produces radial movement of the jaws in one direction, and providing resilient means for urging the jaws in the opposite direction.

Other objects and advantages of the invention will more fully appear from the following description taken in connection with the accompanying drawings in which:

Fig. 4 is a cross sectional view taken on line 4—4 of Fig. 5;

Fig. 5 is a cross sectional view taken on line 5—5 of Fig. 4, showing a work piece in position.

Fig. 6 is a fragmentary sectional view, corresponding to Fig. 5, but showing a different work piece secured in the chuck;

Figures 1, 2:
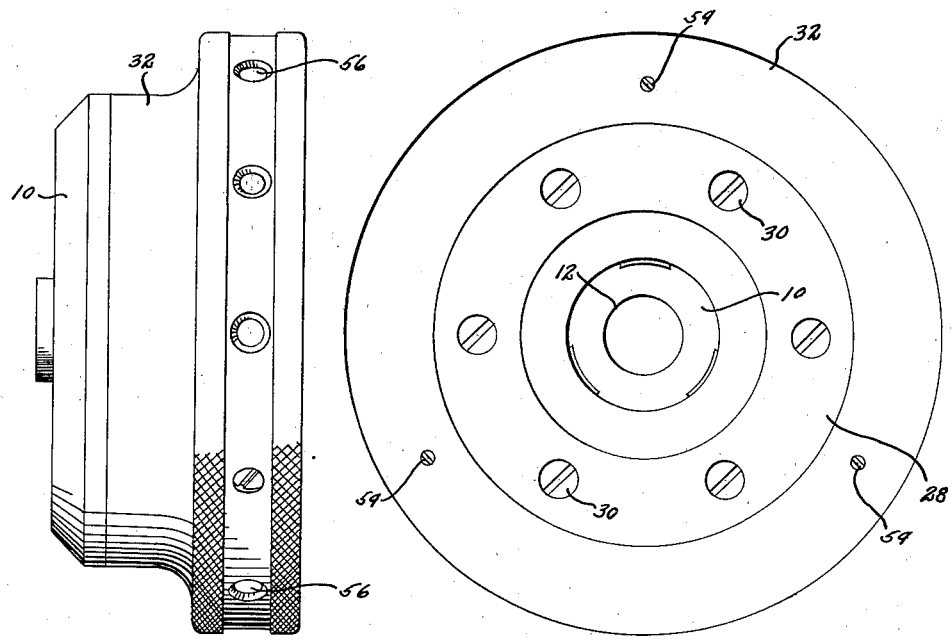
Fig. 1 is a side elevational view of my improved chuck.
Fig. 2 is an end elevational view of Fig. 1.

Figs. 7 to 10 inclusive illustrate various shapes of work pieces, which may be secured in the chuck;

Fig. 11 is a side elevational view of a modified form of the invention;

Fig. 12 is a fragmentary end view of Fig. 11;

Fig. 13 is a sectional view taken on line 13—13 of Fig. 11;

Fig. 14 is a sectional view taken on line 14—14 of Fig. 13;

Fig. 15 is a fragmentary view, partly in section, and partly in top elevation showing the operating jaws illustrated in Fig. 13;

Fig. 16 is a fragmentary sectional view showing one of the operating jaw return means; and Fig. 17 is a fragmentary sectional view of a modified form of chuck member.

Referring to the drawings, particularly to Figs. 4 and 5, I have shown the chuck parts in assembled relation for receiving a work piece. An adaptor plate 10 is provided with an aperture 12 to receive attaching means for securing the plate to a rotatably driven part when it is desired to rotate the work piece or to a stationary supporting part when it is desired to hold the work piece in a predetermined position.

A retaining ring 14 is provided with an aperture 16 for receiving a work piece. The retaining ring 14 is secured to the face of the adapter plate 10 by screws 18. A shoulder 20 on the adapter plate 10 is received in the aperture 16 holding the retainer against radial displacement. The outer periphery of the retainer is frustro-conical having outwardly extending contact ribs 22.

Figure 3:
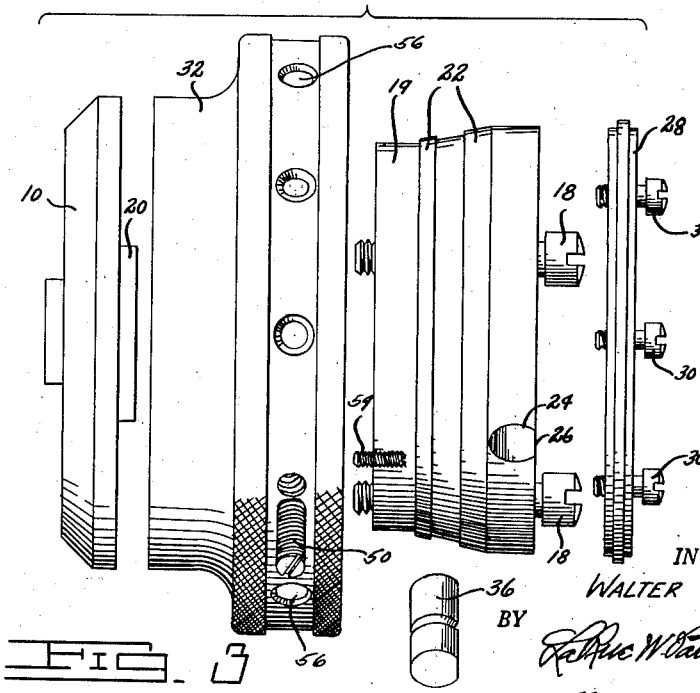
Fig. 3 is an exploded view, showing in side elevation the several parts of the device in approximate location for assembly.

A plurality of circumferentially spaced bores 24 extending radially through the wall of the retainer 14, have their inner peripheries intersected by the front face of the retainer providing lateral openings 26. This is more clearly shown in Fig. 3.

A retainer plate 28 is secured to the front face of the retainer 14 by screws 30 forming a cover for the open wall of the bores 24 thus presenting bores having a portion of their peripheries flat for the purpose of guiding radially movable jaws within the bores, hereinafter more fully described.

A positioning ring 32 is rotatably mounted on the outer periphery of the retainer 14, and the retaining ring 28. The inner periphery of the positioning ring 32 is tapered longitudinally to fit the outer periphery of the retainer 14. A sealing ring 34 is positioned between the retainer plate 28 and the positioning ring 32.

A plurality of radially movable jaws 36 are slidably mounted in the bores 24. The jaws are substantially cylindrical with the exception of a longitudinally extending flat surface 38 for sliding engagement with the inner surface of the retainer plate 28. The flat surface 38 is positioned opposite the lateral opening 26 and through its contact with the plate 28 the jaw is prevented against rotation within the bore. An annular groove 40 is formed in the outer periphery of the jaws 36. A bore 42 is formed through the wall of the retainer 14 and is located opposite the groove 40. A compression spring 44 urges a ball 46 into the groove 40. The spring 44 abuts a screw threaded plug 48. The spring urged ball 46 positions the jaw radially within the bore 24.

The inner ends of the jaws 36 normally project into the aperture 16 and the end faces thereof are shaped to the desired contour for engagement with the outer surfaces of a work piece. If the work piece has an annular surface, the end face of the jaw is concave; if the jaw is to engage a flat surface the end face of the jaw is flat, and if it is desired to engaged a work piece having gear teeth on its outer periphery, the end faces of the jaws may be pointed or formed as a knife edge for engagement on the pitch diameter between the gear teeth.

The opposite, or outer end faces 49 of the jaws 36 are beveled, so that the face thereof lies in a plane at an angle to a plane perpendicular to the axis of the jaw. The longest side of the jaw has its outer edge substantially flush with the outer periphery of the retainer 14 and its diametrically opposite edge spaced inwardly from the outer periphery of the retainer.

Pressure pins 50 in the form of adjusting screws are received in threaded openings in the retainer 14. The openings are extended radially through the outer periphery of the retainer providing access for a tool such as a screw driver for turning the pressure pins 50 threaded in the openings. The inner ends of the pins 50 are hardened and tapered, having a pointed end 52 for contact with the outer beveled ends of the jaws. Set screws 54 threaded in openings in the outer end face of the retainer are provided for locking the pressure pins 50 in adjusted position.

The positioning ring 32 is rotatably mounted on the retainer 14 and a plurality of radially extending openings 56 are formed in the outer periphery of the positioning ring for receiving a tool, such as a spanner wrench not shown.

Figs. 6 to 10 inclusive illustrate some of the various shapes of work pieces, which may be held in the chuck. In Fig. 6 a work piece 58 is shown in locked position in the chuck. The work piece 58 is substantially cylindrical except for a flat face 60 at one side thereof. Assuming that it is desired to bore a hole 62 in the work piece concentrically located to the outer periphery portion which is circular, a plurality of spaced jaws can be brought into holding engagement with the outer periphery of the work piece, including the flat portion 60 having a comparatively shorter radial dimension. As shown, two of the jaws 36 are substantially equal in length for contacting the circular portion of the work piece and the third jaw 64 having a longer dimension, is substituted for a jaw of a length corresponding to the jaws 36. The length of the jaws 36 and 64 are preselected and determined by the size and outer peripheral shape of the work piece. They are of a length to extend from their contact with the work to the outer peripheral surface of the retainer 14.

If it is desired to machine an eccentrically located opening, such as 66 in an annular work piece 68, Fig. 7, the length of the jaws are selected to hold the work piece eccentrically in the aperture 16 of the retainer 14 with the opening 66 concentrically located in the aperture 16. It will be understood that the square shape, shown in Fig. 8 or the irregular shape shown in Fig. 9 may be held between the jaws by the proper selection of the length of each jaw. If it is desired to hold a gear, Fig. 10, in the chuck, the jaws may engage the teeth of the gear at the pitch diameter, root diameter or at the outer diameter.

When a work piece is to be placed in the chuck, the length of the jaws is determined by the distance of the outer surface on the work piece from the center of the operating tool. The various lengths depend upon the shape of the work piece and the location of the center of the operation to be performed on the work piece. After the lengths have been preselected, an accurate dimension then may be obtained within minute variations by adjustment of the pressure pins 50 so that the inner faces of the jaws are in contact with the outer surface of the work, when the work is accurately positioned relative to the desired center of the cut, and the low edge of the outer beveled surface 49 is in contact with the pointed end 52 of the pressure pin 50. After the proper adjustment is made the lock screws 54 are tightened to prevent movement of the pressure pins 50. In this position of the parts the work is slidingly fitted between the jaws 36 for insertion or removal. By rotating the positioning ring 32, relative to the retainer 14, in a clockwise direction the pointed ends 52 ride over the beveled surfaces 49, forcing the jaws inwardly into gripping engagement with the outer surface of the work piece.

After the operation has been performed on the work, the retaining ring 32 is turned in a counter clockwise direction and the spring urged balls 46, bearing against the upper surface of the grooves 40 urge the jaws outwardly out of the holding engagement with the work piece.

From the foregoing, it will be understood that I have provided a chuck adapted to receive various shaped objects by a simple operation of replacing one of a plurality of different size jaws for another and that the work is easily inserted or removed.

In the form of the invention illustrated in Figs. 11 to 17 inclusive the operating jaws, similar to the operating jaws 36 shown in Fig. 4, are provided for operating a standard draw chuck, either of the internal or external type.

An arbor plate 70 receives a retaining ring 72 on its front face by screws 74. The retaining ring 72 is provided with annular peripheral portion 76 which receives a positioning ring 78 rotatably mounted on the peripheral portion 76. The ring 78 is provided with an undercut 80 which receives a retaining plate 82 secured to the retaining ring 72 by screws 84.

An axially extending bore 86 is formed through the retaining plate 82, retaining ring 72 and partially through the arbor plate 70. The outer face of retaining plate 82 is provided with an outwardly extending sleeve 88 which is longitudinally slotted, as at 90 to permit radial flexibility. The outer periphery of the sleeve 88 is adapted to receive an apertured work piece which is held in operating position by outward expansion of the sleeve wall by friction.

As a means for expanding the sleeve 88 I have provided a rod 92 having a tapered end 94 slidably mounted in the bore 86. The outer periphery of the rod 92 has oppositely disposed V notches 96 for the reception of tapered end portions 98 on radially movable plungers 100 in radially extending openings 102 in the retaining ring 72. The outer ends of the plungers 100 are tapered at 104, similar to the end faces of the jaws 36 shown in Fig. 5. Screws 106 having pointed inner ends are threaded in the wall of the positioning ring 78. It will be understood from the foregoing description of the device shown in Figs. 1 to 6 inclusive, that relative rotation of the positioning ring 78 to the retaining ring 72 will move the plungers radially in the openings 102.

The plungers 100 are slotted as at 108 for the reception of a pin 110 carried by the retaining ring 72. A compression spring 112 is positioned between one end of the slot 108 and the pin 110 for urging the plungers 100 outwardly with the tapered faces 104 in contact with the pointed end of the screws 106.

A compression spring 112 is received in the closed end of the bore 86 and under the rod 92 outwardly, the latter being held by the tapered ends 98 in contact with one side of the V notches 96 in the rod 92.

When it is desired to hold a work piece on the sleeve 80, it is positioned over the outer periphery of the sleeve, and the positioning ring 78 is turned clockwise forcing the plunger 100 inwardly. The tapered surfaces of the plungers acting on the side of the V groove force the rod 92 inwardly and the tapered end 94 expands the sleeve 88 into holding engagement with the work piece.

If it is desired to engage the outer periphery of a work piece, the tapered end 94' may be slotted as at 114, Fig. 17, and the sleeve 88' will then contract the tapered end 94' of the rod 92'.

Various changes, including the size, shape and arrangement of parts may be made without departing from the spirit of my invention, and it is not my intention to limit its scope other than by the terms of the appended claims.

I claim:

1. A chuck comprising a retaining ring having an axial opening therein for receiving a work piece, radially extending jaws slidably carried in said retaining ring and movable into and out of the axial opening in said retaining ring, the outer ends of said jaws having beveled surfaces, a rotatable ring on the outer periphery of said retaining ring, and radially adjustable projections carried by said rotatable ring for engagement with the beveled surfaces of said jaws.

2. A chuck comprising a retaining ring having an axial opening therein for receiving a work piece, radially extending jaws slidably carried in said retaining ring and movable into and out of the axial opening in said retaining ring, the outer ends of said jaws having beveled surfaces, a rotatable ring on the outer periphery of said retaining ring, means for urging said jaws radially adjustable projections carried by said rotatable ring for engagement with the beveled surfaces of said jaws.

3. A chuck comprising a retaining ring having an axial opening therein for receiving a work piece, radially extending jaws slidably carried in said retaining ring and movable into and out of the axial opening in said retaining ring, the outer ends of said jaws having beveled surfaces, a rotatable ring on the outer periphery of said retaining ring, means for preventing relative rotation of said jaws with respect to said retaining ring, means for urging said jaws radially outwardly, and radially adjustable projections carried by said rotatable ring for engagement with the beveled surfaces of said jaws.

4. A chuck comprising an adapter plate, a retaining ring having an axial bore therethrough secured to said adapter plate, said retaining ring having radially extending and circumferentially spaced bores through the wall thereof, jaws slidably mounted in the radially extending bores, said jaws being substantially cylindrical and having a beveled outer end face, a positioning ring rotatably received on the outer periphery of said retaining ring, and radially adjustable projections carried by said rotatable ring for engagement with the beveled end surface of said jaws.

5. A chuck comprising an adapter plate, a retaining ring having an axial bore therethrough secured to said adapter plate, said retaining ring having radially extending and circumferentially spaced bores through the wall thereof intersecting the outer end face of said retaining ring, jaws slidably mounted in the radially extending bores, said jaws being substantially cylindrical and having a beveled outer end face, a flat side portion on said jaws adjacent the intersection of the bores with the end face of said retaining ring, a positioning ring rotatably received on the outer periphery of said retaining ring, a retainer plate secured to the outer end face of said retaining ring in contact with the flat face portion on said jaws, and radially adjustable projections carried by said rotatable ring for engagement with the beveled end surface of said jaws.

6. A chuck comprising an adapter plate, a retaining ring having an axial bore therethrough secured to said adapter plate, said retaining ring having radially extending and circumferentially spaced bores through the wall thereof intersecting the outer end face of said retaining ring, jaws slidably mounted in the radially extending bores, said jaws being substantially cylindrical and having a beveled outer end face, a flat side portion on said jaws adjacent the intersection of the bores with the end face of said retaining ring, a positioning ring rotatably received on the outer periphery of said retaining ring, a retainer plate secured to the outer end face of said retaining ring in contact with the flat face portion on said jaws, means for urging said jaws outwardly, and radially adjustable projections carried by said rotatable ring for engagement with the beveled end surface of said jaws.

7. A chuck comprising a retaining ring having an axially extending bore therein and radially extending bores through the wall of said retaining ring, jaws radially slidable in the radially extending bores, a positioning ring rotatably mounted on the outer periphery of said retaining ring radially adjustable projections carried by said positioning ring for positioning said jaws, and a rod slidably mounted in the axially extending bore in said retaining ring having a tapered end portion and tapered surfaces, intermediate the ends thereof for cooperation with the inner ends of said jaws, a longitudinally split sleeve surrounding the tapered end of said rod, and resilient means for urging said rod outwardly of said retaining ring.

8. A chuck comprising a retaining ring having an axially extending bore therein, radially extending jaws slidably carried in said retaining ring and movable into and out of the axially extending bore, a rotatable ring on the outer periphery of said retaining ring, and radially adjustable means carried by said rotatable ring for positioning said jaws radially in said retaining ring.

WALTER COULSON.